United States Patent [19]

Gilevich et al.

[11] Patent Number: 5,149,171

[45] Date of Patent: Sep. 22, 1992

[54] WALKOVER SEAT WITH INERTIAL LATCH

[75] Inventors: Leonid Gilevich, Skokie; James C. Masters, Glen Ellyn, both of Ill.

[73] Assignee: Coach and Car Equipment Corporation, Elk Grove Village, Ill.

[21] Appl. No.: 552,825

[22] Filed: Jul. 16, 1990

[51] Int. Cl.[5] ............................................. B60N 2/02
[52] U.S. Cl. ........................................ 297/94; 297/101
[58] Field of Search ................. 297/94, 95, 96, 97, 297/98, 99, 100, 101, 102, 103, 104, 92, 216, 379, 373, 374, 375; 180/330, 331

[56] References Cited

U.S. PATENT DOCUMENTS

| | | | |
|---|---|---|---|
| 505,246 | 9/1893 | Hale | 297/95 |
| 580,576 | 4/1897 | Hale | 297/96 |
| 639,894 | 12/1899 | Gibbs | 297/96 |
| 676,170 | 6/1901 | Witte | 297/96 |
| 787,603 | 4/1905 | Witte | 297/98 |
| 1,140,342 | 5/1915 | Anger | 297/101 |
| 2,660,222 | 11/1953 | Woodsworth | 297/216 |
| 2,726,708 | 12/1955 | Eickhorn et al. | 297/95 |
| 2,922,461 | 1/1960 | Braun . | |
| 3,265,435 | 8/1966 | Bilancia . | |
| 3,479,082 | 11/1969 | Bilancia | 297/103 |
| 4,407,542 | 10/1983 | Kehl et al. . | |
| 4,988,134 | 1/1991 | Vidwans et al. | 297/379 X |

Primary Examiner—Kenneth J. Dorner
Assistant Examiner—James M. Gardner
Attorney, Agent, or Firm—Marshall, O'Toole, Gerstein, Murray & Bicknell

[57] ABSTRACT

A vehicle seat has a seat back mounted for walkover movement from one end of the seat to the other end. Associated with the seat back is an inertial latching system which is normally inoperative so as to allow walkover movement of the seat back. During deceleration of the vehicle above a preselected magnitude, the latching system is actuated to restrain walkover movement of the seat back and to progressively absorb any impact into the seat back from behind, as would occur during a sudden stop or crash. The latching system automatically deactuates itself upon cessation of any tendency by the seat back to undergo walkover movement.

35 Claims, 6 Drawing Sheets

WALKOVER SEAT WITH INERTIAL LATCH

BACKGROUND OF THE INVENTION

The present invention relates generally to seats for mass transit vehicles such as railroad commuter cars and more particularly to walkover seats for such vehicles.

A walkover seat is one in which a seat back may be moved from the front end to the rear end of the seat to allow the seat occupant or passenger to face whichever direction the occupant desires. It also allows two adjacent seats in a row of seats to be arranged so that the occupants of the two seats face each other in a group, when the occupants desire such an arrangement. A walkover seat allows one to reposition the seat back to one's liking, creating forward facing, rearward facing or a group cluster of seats.

A walkover seat employs pivotal linkages between the seat back and the frame of the seat to accomplish the walkover movement and employs other linkages to change the inclination of the seat cushion in response to repositioning of the seat back. Examples of walkover seats employing such linkages are shown in Kehl et al U.S. Pat. No. 4,407,542, and in Bilancia U.S. Pat. No. 3,265,435, and the disclosures thereof are incorporated herein by reference.

There have been walkover seats which did not employ any provision for locking the backrest in either of its two rest positions. In one respect, this was advantageous because it allowed the seat back to be repositioned at will, without the need to actuate release levers, pedals, linkages or switches normally associated with locking mechanisms. This made it very convenient for passengers or train personnel to reposition the seat back, but it had other drawbacks.

More particularly, in the case of an abrupt stop, as in the event of a vehicle crash, inertia causes a passenger to be thrown forward into the seat back in front of that passenger, and a walkover seat back receiving the impact of the passenger would, in response to that impact, move from the rest position it was in at the time of impact toward the opposite rest position of the seat back. A seat back is normally inclined, i.e. the angle of the seat back is displaced from true vertical. As a walkover seat back moves from one rest position to the other rest position, in response to impact by a passenger, the angle of inclination changes from a rearward inclination to a frontward inclination. As a result of this change in inclination, the seat back acts as a ramp for the passenger who has impacted against the seat back and directs the passenger frontwardly and upwardly into the overhead structure, e.g. an overhead luggage rack or the floor of an upper level of seating in a bi-level car. This increases the potential for injury to the passenger.

One attempt to eliminate the problem described in the preceding paragraph was to fix the seat back against walkover movement. This proved to be very unpopular with passengers, most of whom preferred to face forward when the vehicle was in motion. In addition, it eliminated the flexibility of group clusters, which was available with walkover seat backs.

Another attempt to solve the problem was to provide the walkover seat with a locking mechanism which normally locked the seat back against walkover movement but which could be unlocked with release handles or pedals, but this too had drawbacks. A seat employing the locking mechanism was considered to be not user friendly. Passengers unfamiliar with the locking system had to hunt for the release handles or pedals. Manually unlocking the walkover seat back before moving it from one position to another required more complicated efforts on the part of a passenger or train personnel, and the need to perform these additional efforts slowed down considerably the speed with which train personnel could change the facing direction of all the seat backs in an entire car. The release handles or pedals, and the associated locking mechanism, were susceptible to damage, necessitating maintenance and repair procedures not previously required for walkover seats.

A serious drawback of both fixed seat backs and normally locked walkover seat backs was the increased impact load experienced by a passenger who impacted against a seat back which did not give or yield when impacted. Unlike an unlocked walkover seat back, a fixed seat back or a normally locked walkover seat back remained in place when impacted by a passenger who, as a result, experienced a greater impact load than did a passenger who impacted against an unlocked, walkover seat back.

An example of a walkover seat employing a locking arrangement with a release handle is disclosed in the aforementioned Kehl et al U.S. Pat. No. 4,407,542.

SUMMARY OF THE INVENTION

The present invention provides a walkover seat which eliminates the drawbacks and disadvantages of the seats described above. The seat back can be moved from one rest position to another rest position without the need to operate any release handle or pedal. On the other hand, when the seat back is impacted, as in the case of an abrupt stop or crash, mechanisms are provided which prevent the seat back from acting as a ramp that directs the impacting passenger into the overhead structure. In addition, the seat back gives or yields in response to impact, thereby decreasing the impact load experienced by an impacting passenger, and there is also structure which progressively absorbs the impact load.

A walkover seat in accordance with the present invention includes a latching system comprising a latch element mounted for movement between a normal, inactive, non-latching rest position and a latching position. The latch element is normally maintained in its non-latching rest position to allow walkover movement of the seat back. The latching system is automatically activated and comprises structure, responsive to deceleration of the vehicle at a preselected magnitude, for moving the latch element into its latching position. Deceleration of the vehicle may be normal or abnormal. Normal deceleration is a relatively moderate deceleration as would occur during normal operation of the vehicle. The latching system can be adjusted so that activation occurs at a preselected normal deceleration, e.g. 0.3 g ("g" being the force of gravity or 32 ft./sec.$^2$). A seat back will not usually undergo walkover movement by itself at such a relatively moderate deceleration.

Abnormal deceleration of the vehicle typically occurs when the vehicle undergoes an abrupt stop, as in a crash, in which case a passenger seated behind a given seat back is usually propelled by inertia into that seat back. As a result of abnormal deceleration, a seat back can undergo walkover movement due solely to the forward inertia of the seat back itself.

The latching system further comprises structure for maintaining the latch element in its latching position for at least as long as the seat back is urged to undergo walkover movement, as by abnormal deceleration of the vehicle. In addition, the latching system comprises structure for automatically returning the latch element to its non-latching, rest position upon cessation of the urge by the seat back to undergo walkover movement, although when the latching system has been adjusted to activate at a normal deceleration, the latch element will not return to its rest position until there has also been a decrease in deceleration to a magnitude below the activation level. The structure which moves the latch element into its latching position and which automatically returns the latch element to its rest position includes a pendulum arrangement, and the pendulum arrangement can be adjusted to change the magnitude of vehicle deceleration at which the latching system is automatically activated.

The latching system also includes dampening structure actuable in response to movement of the latch element to its latching position for absorbing the impact against the seat back occurring as a result of abnormal decleration and for progressively opposing walkover movement of the seat back. The dampening structure is typically in the form of a torsion member the effective length of which can be preset to vary the give or yield which occurs when a passenger impacts against the seat back. The dampening structure gradually absorbs the impact of the passenger against the seat back, rather than simply resisting it.

Because the latching mechanism initially resists and then gradually absorbs passenger impact into the seat back, there is no ramping affect as would otherwise result from a combination of the forward inclination of the seat back and the forward inertia of the passenger which combine to propel the passenger into the overhead structure. As a result, the potential for injury to the passenger is substantially decreased.

The latching system is automatically activated only when the vehicle undergoes decleration, and as noted above, the magnitude of the deceleration at which activation occurs depends upon the adjustment of the pendulum arrangement. At all other times, the walkover seat may be freely moved between its two normal rest positions, respectively at the front end and the rear end of the seat, without the need to manipulate a release handle or pedal or the need to engage in any type of latch deactuating activity. Because the latching system is operated relatively seldom and because there are no actuating handles or pedals requiring operation by a passenger, the need for repairs or maintenance of the latching system is essentially eliminated.

The entire latching mechanism is housed in a pocket located adjacent one side of the seat and is relatively inaccessible to a passenger. Because of this, there is no potential for injury to the passenger as might occur if the passenger were to come into contact with any part of the latching mechanism.

Other features and advantages are inherent in the structure claimed and disclosed or will become apparent to those skilled in the art from the following detailed description in conjunction with the accompanying diagrammatic drawings.

DETAILED DESCRIPTION

Figure 1:
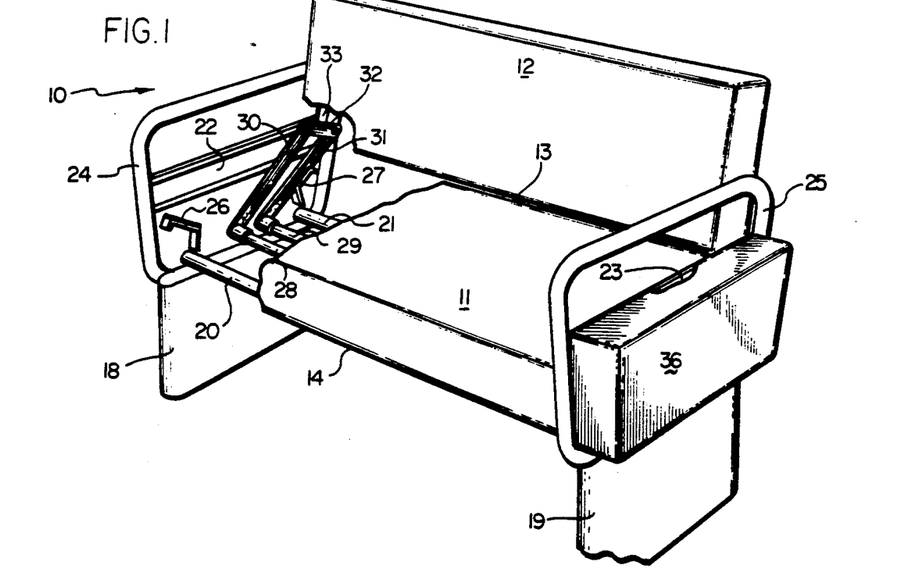
FIG. 1 is a perspective of a vehicle seat having a seat back mounted for walkover movement.
Figure 2:
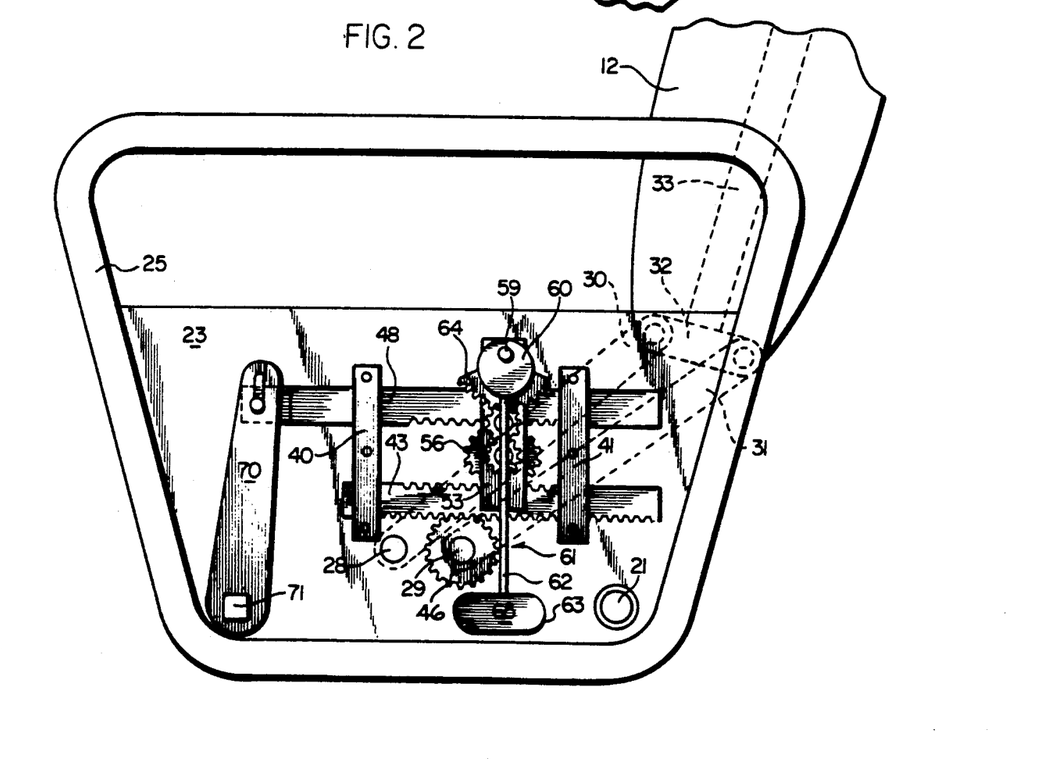
FIG. 2 is an enlarged, fragmentary, side elevational view partially cut away, illustrating an embodiment of a latching system for the walkover seat back, in accordance with the present invention.

Referring initially to FIG. 1, indicated generally at 10 is a walkover seat comprising a seat cushion 11 and a seat back 12 mounted for walkover movement between a pair of rest positions each located adjacent one of a pair of opposed seat ends 13, 14 respectively.

Seat 10 comprises a pair of pedestals 18, 19 supporting a pair of tubular cross members 20, 21 in turn supporting a pair of side frame plates 22, 23 each constituting part of a respective seat side also including a tubular frame member 24, 25 the tops of which define the respective arm rests on each side of the seat.

Pivotally mounted between side plates 22, 23 are a pair of rotatable shafts 28, 29. Fixed at each opposite end of each rotatable shaft 28, 29 is the lower end of a respective link member 30, 31 the upper ends of each of which are pivotally connected to a link element 32 in turn attached to the bottom of a vertically disposed portion 33 of a back frame for seat back 12.

There is a linkage composed of link members 30, 31 and link element 32 located adjacent each side plate 22, 23 of seat 10. These linkages, together with rotatable shafts 28, 29 constitute the structure which mounts seat back 12 for walkover movement. Located on each side plate 22, 23 are a pair of stops 26, 27 which engage link members 30, 31 respectively when seat back 12 is in one of its two rest positions.

Removably mounted on side plate 23, in any conventional manner, is a housing 36 enclosing a latching system which is normally inoperative, to permit walkover movement of the seat back, but which is actuated by deceleration of the vehicle above a preselected magnitude to restrain walkover movement of the seat back and to absorb any impact against the walkover seat back from behind resulting from a sudden stop or crash. Walkover movement of the seat back can be initiated by abnormal deceleration of the vehicle. In such a case, the walkover movement is due to the forward inertia of the seat back itself. Actuation of the latching system occurs at a deceleration no greater than and usually substantially less than the abnormal deceleration which initiates walkover movement of the seat, so that the latching system usually has already been activated before the aforementioned walkover movement is initiated.

An embodiment of the latching system enclosed within housing 36 is illustrated in FIGS. 2-5. Mounted on the outer surface of the seat's side plate 23 are a pair of vertically disposed elements, 40, 41 each having a lower rectangular opening 42 for slidably mounting a first slidable member 43 having a lower row of gear teeth 44 and an upper row of gear teeth 45. Engaging lower row of gear teeth 44 is a gear 46 fixedly mounted on rotatable shaft 29.

When seat back 12 undergoes walkover movement, the linkage (30-32) connecting seat back 12 with rotatable shaft 29 causes shaft 29 to rotate, in turn rotating gear 46 which, by virtue of its engagement with the lower row of gear teeth 44, causes first slidable member 43 to undergo sliding movement in relation to vertical posts 40, 41. When seat back 12 moves from one seat end 13 to the other seat end 14 (see FIG. 1), first slide member 43 is moved in a direction toward seat end 14. Conversely, when seat back 12 is moved from seat end 14 toward seat end 13, first slide member 43 is moved toward seat end 13. In other words, first slide member 43 is mounted for reciprocal sliding movement relative to vertically disposed elements 40, 41.

Each vertically disposed element 40, 41 has an upper rectangular opening 47 for slidably mounting an upper or second slidable member 48 which is vertically spaced from first slidable member 43. Second slidable member 48 has a lower row of gear teeth 49 and is mounted for reciprocal sliding movement in relation to vertically disposed elements 40, 41. Each of first and second slide members 43, 48 constitutes a horizontally disposed slide bar mounted for reciprocal sliding movement in a horizontal direction, and each of the slide bars lies in substantially the same vertical plane in vertically spaced relation to the other slide bar.

During normal walkover movement of the seat back (latching system inactive), second slidable member 48 is stationary and does not undergo sliding movement. During walkover movement of the seat back initiated by abnormal deceleration of the vehicle, (latching system active) second slidable member 48 does undergo slidable movement together with first slidable member 43, and the mechanism which effectuates that movement will now be described.

Mounted on the outside surface of first slide member 43 is the lower end of a vertically disposed member 53 on which is rotatably mounted a shaft 54. Fixed on shaft 54, adjacent the outer surface of vertically disposed member 53, is a round gear 55, and fixed on shaft 54, adjacent the inner surface of vertically disposed member 53 is an elliptical gear 56 constituting one embodiment of a latch element in accordance with the present invention. Also, rotatably mounted on vertically disposed member 53 is a shaft 74 located above rotatable shaft 54. Fixed on shaft 74 is a reversing gear 75 engaging gear 55.

Figure 4:
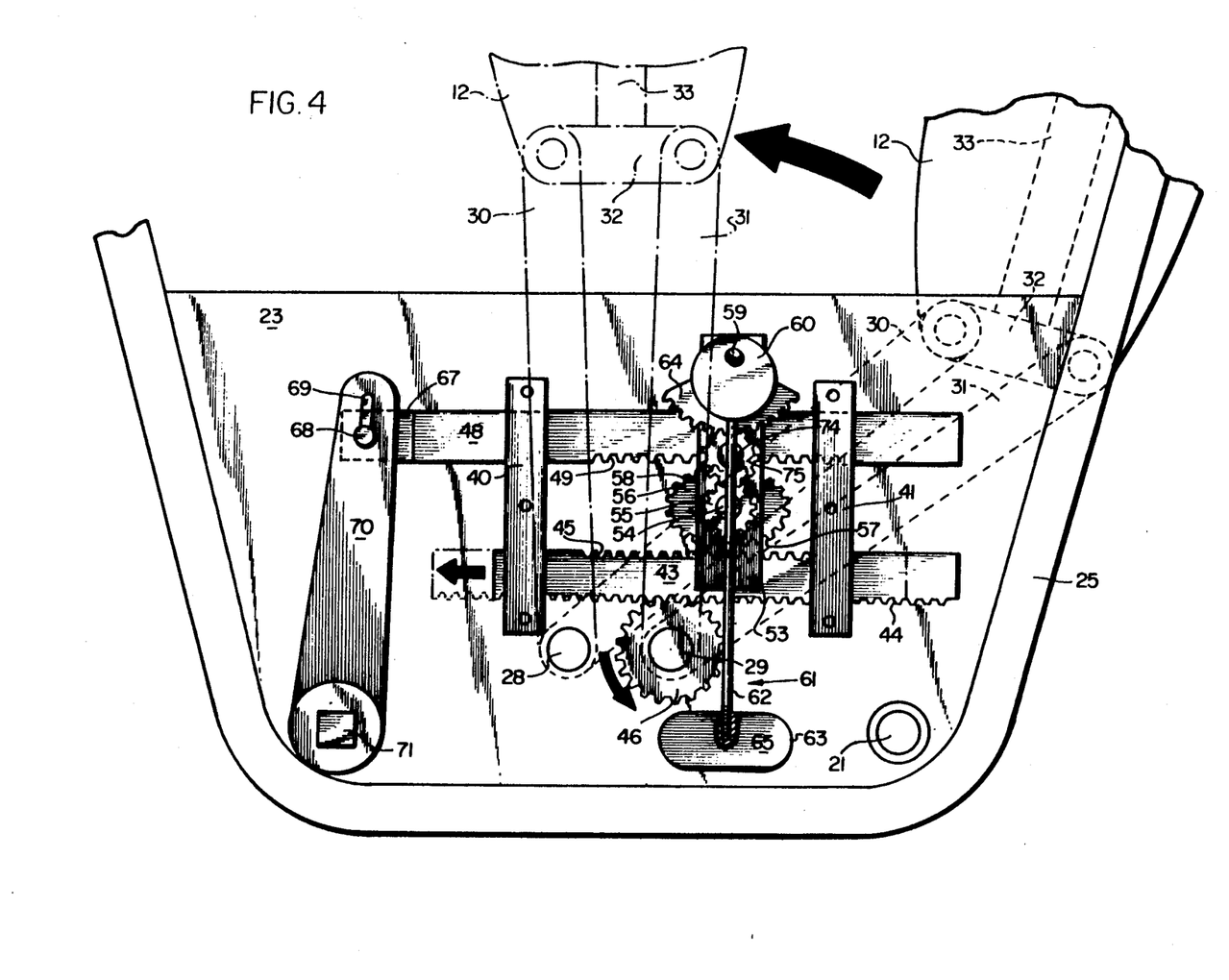
FIG. 4 is an enlarged, fragmentary, side elevational view illustrating the latching system in a non-latching condition.
Figure 5:
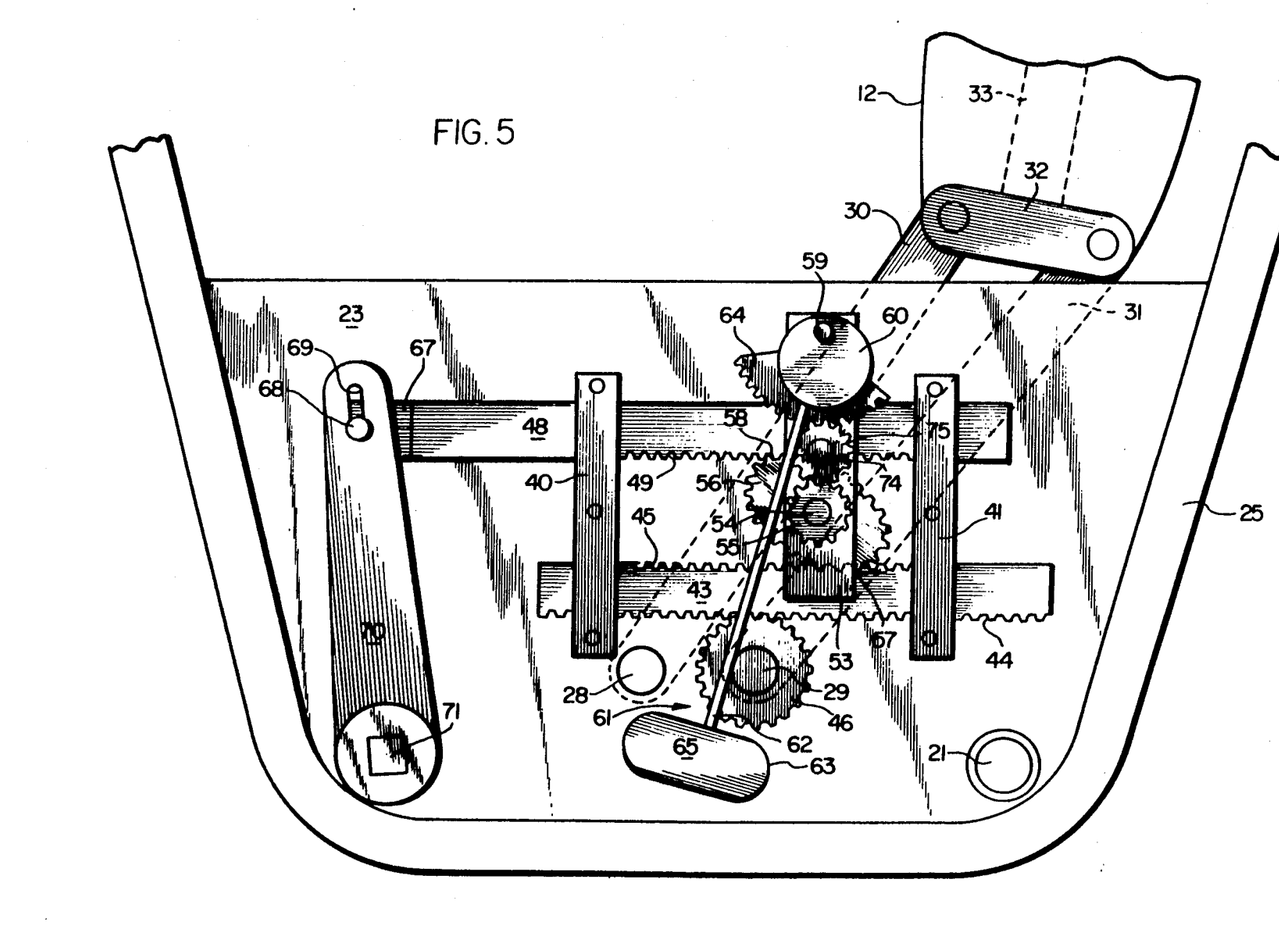
FIG. 5 is a view similar to FIG. 4 illustrating the latching system in a latching condition.

Elliptical gear 56 is located between first and second slide members 43, 48 and is mounted on rotatable shaft 54 for movement of gear 56 between a non-locking position shown in FIG. 4 and a locking position shown in FIG. 5. When elliptical gear 56 is in its locking position, it engages both of first and second members 43, 48 (FIG. 5), and when elliptical gear 56 is in its non-locking position, it is disengaged from at least second member 48 (FIG. 4). In the illustrated embodiment, elliptical gear 56 is disengaged from both first and second members 43, 48 when the elliptical gear is in its non-locking position. By virtue of its mounting on rotatable shaft 54, which is carried by vertically disposed member 53 which in turn is carried by first slidable member 43, elliptical gear 56 is mounted for movement with first member 43, independent of the movement of the elliptical gear between its locking and non-locking positions.

Elliptical gear 56 is normally maintained in its non-locking position, illustrated in FIG. 4, by structure now to be described. Located near the upper end of vertically disposed member 53, and extending outwardly therefrom is a pin 59 which pivotally mounts the upper portion 60 of a pendulum indicated generally at 61 and comprising a pendulum arm 62 at the lower end of which is located a pendulum bob 63. By virtue of the mounting arrangement described in the preceding sentence, pendulum 61 is carried with first slidable member 43 as member 43 undergoes reciprocal sliding movement.

Pin 59 mounts pendulum 61 for swinging movement, independent of its movement with first slidable member 43, between a vertically disposed pendulum rest position, illustrated in FIG. 4, and a second position, shown in FIG. 5, in which the pendulum is angularly displaced from its rest position. Pendulum 61 is normally maintained in its rest position (FIG. 4) during normal walkover movement of the seat back, and this occurs when the vehicle is at rest or is moving at substantially constant speed. In addition, the characteristics of the pendulum (e.g. length, weight, etc.) are such that the pendulum is maintained out of its second position (FIG. 5) during vehicle accelerations and during certain normal vehicle decelerations below a magnitude which depends upon adjustment of the pendulum characteristics, and this will be explained more fully subsequently. However, during all abnormal decelerations of the vehicle and during certain normal decelerations above a magnitude which depends upon adjustment of the pendulum characteristics, the pendulum is urged to its second position shown in FIG. 5, and when this occurs, a mechanism is actuated which moves elliptical gear 56 into its locking position shown in FIG. 5.

More particularly, attached to pendulum 61, near the upper end thereof, is a gear segment 64 which engages reversing gear 75 which in turn engages gear 55. Gear segment 64 swings with pendulum 61, and as gear segment 64 swings, it rotates reversing gear 75 which rotates engaged gear 55 in turn rotating shaft 54 which in turn pivots elliptical gear 56 from its non-locking position shown in FIG. 4 to its locking position shown in FIG. 5. Gear 55, shaft 54 and elliptical gear 56 rotate in the same sense as that in which pendulum 61 swings, by virtue of the interposition of reversing gear 75 between gear segment 64 and gear 55.

As shown in FIG. 5, elliptical gear 56 has a first plurality of teeth 57, for engagement with the upper row of gear teeth 45 on first slidable member 43, and a second plurality of gear teeth 58, spaced from first plurality of gear teeth 57, for engagement with the lower row of gear teeth 49 on second slidable member 48, when elliptical gear 56 is in its locking position shown in FIG. 5. When elliptical gear 56 is thus engaged with both lower first slidable member 43 and upper second slidable member 48, the second slidable member is linked to the first slidable member for sliding movement together.

When the vehicle undergoes abnormal deceleration, first member 43 undergoes sliding movement in response to walkover movement of the seat back due to the seat back's forward inertia. First member 43 is urged to undergo sliding movement for so long as there is a tendency for the seat back to undergo walkover movement. Moreover, once elliptical gear 56 has been pivoted into its locking position, it will remain in that position, linking second slidable member 48 to first slidable member 43, for movement together, for so long as first member 43 is urged to undergo the sliding movement described in the preceding two sentences. In other words, elliptical gear 56 is maintained in its locking position for at least as long as the seat back has a tendency to undergo walkover movement initiated by abnormal deceleration of the vehicle.

When second slidable member 48 moves together with first slidable member 43, in the manner described in the preceding paragraph, there is actuation of structure for progressively retarding that movement which in turn progressively retards or opposes walkover movement of the seat back, and this will now be described in more detail.

Second slidable member 48 has an end 67 connected by a pin and slot arrangement 68, 69 to the upper end of a lever 70 having a lower end fixed to the unrestrained end of a torsion member 71 having a restrained end fixed at a location axially spaced, along the torsion member, from the location at which lever 70 is fixed to the unrestrained end of the torsion member. Torsion member 71 may be of any conventional construction heretofore employed for torsion members. In one embodiment, torsion member 71 may have a cross-section comprising a plurality of alternating layers of spring steel and rubber strips.

In a typical embodiment, the seat's cross member 20 is a tube enclosing torsion member 71, and torsion member 71 extends from the attachment of its unrestrained end with the lower end of lever 70, through tubular cross member 20, to a location within cross member 20 where the restrained end of torsion member 71 is fixed to cross member 20. Torsion member 71 may be fixed to cross member 20 at various locations between the physical ends of torsion member 71 to vary the torsion member's effective resistance to twisting. The location on the torsion member where it is fixed to the tubular cross member is, in effect, the restrained end of the torsion member. The shorter the distance between the torsion member's restrained and unrestrained ends, the greater the resistance to twisting.

Torsion member 71 constitutes dampening structure, which is actuable in response to movement of elliptical gear 56 to its locking position, for progressively retarding or opposing walkover movement by the seat back which would occur during a sudden stop or crash on the part of the vehicle (abnormal deceleration).

As a result of the linkage between torsion member 71 and end 67 of slide member 48, sliding movement of slide member 48 is translated into twisting action on the part of torsion member 71, and this action is what functions to progressively retard or oppose seat back walkover movement initiated by abnormal deceleration of the vehicle. In addition, any impact exerted against seat back 12, as a result of a sudden stop or crash is absorbed by torsion member 71. The dampening structure embodied in torsion member 71 gradually absorbs the impact of a passenger against seat back 12, rather than simply resisting it. This in turn lessens the chance of injury to a passenger resulting from impact by that passenger into seat back 13, from behind, during a sudden stop or crash. As noted above, the effective length of torsion member 71 can be preset to vary the give or yield which occurs when a passenger impacts against seat back 12.

Torsion member 71 is merely one embodiment of shock absorbing structure. One may also employ other embodiments of shock absorbing structure, including mechanical, pneumatic, hydraulic or structural shock absorbers. For each embodiment, the shock absorber is actuated by second member 48 as member 48 undergoes sliding movement.

Because the latching mechanism initially resists and then gradually absorbs passenger impact into seat back 12, there is no ramping affect as would otherwise result from a combination of the forward inclination of the seat back and the forward inertia of the passenger which combine to propel the passenger into the overhead structure. As a result, the potential for injury to the passenger is substantially decreased.

Upon cessation of the tendency of the seat back to undergo walkover movement initiated by abnormal deceleration of the vehicle, the normal functioning of pendulum 61 will return the pendulum from its second, angularly displaced position shown in FIG. 5, toward its vertically disposed rest position shown in FIG. 4. This assumes, of course, that the vehicle's deceleration has decreased in magnitude below the preselected level at which the latching system was activated. When this occurs, elliptical gear 56 is returned from its locking position, shown in FIG. 5, to its normal, non-locking position shown in FIG. 4. In other words, elliptical gear 56 is automatically returned to its rest position by the pendulum upon cessation of walkover movement initiated by abnormal deceleration of the vehicle and upon the requisite decrease in vehicle deceleration. Prior thereto, the pendulum was restrained from returning toward its rest position by the forces maintaining elliptical gear 56 in its locking position, i.e. (1) the tendency of the seat back to undergo walkover movement initiated by abnormal deceleration of the vehicle and (2) the vehicle's deceleration above a preselected magnitude.

Elliptical gear 56 lies in substantially the same vertical plane as that in which slidable members 43, 48 lie. Torsion member 71 extends in a direction transverse to that vertical plane, and pendulum 60 swings in an arc lying in a vertical plane parallel to the vertical plane in which slidable members 43, 48 and elliptical gear 56 lie. Elliptical gear 56 is mounted for pivotal movement about the pivot axis of shaft 54 which extends transversely to the vertical plane in which lie slidable members 43, 48 and elliptical gear 56.

Figure 6:
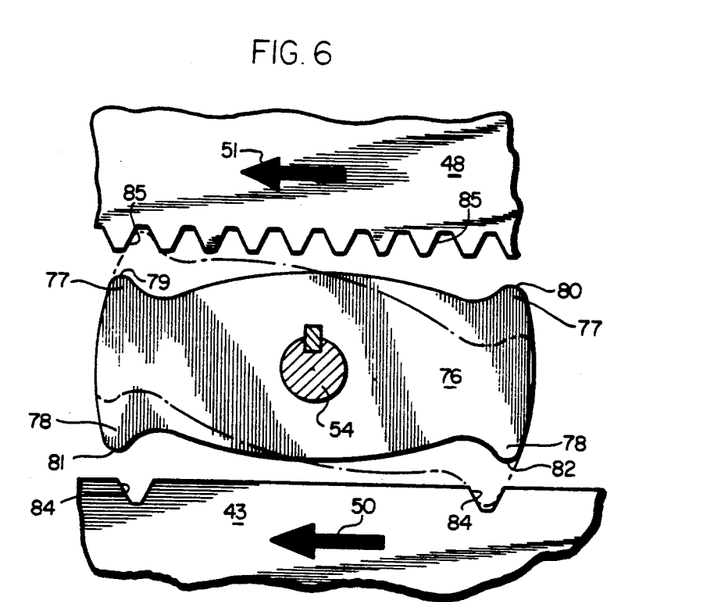
FIG. 6 is an enlarged, fragmentary, side elevational view of an embodiment of a latching element in accordance with the present invention.
Figures 7, 8:
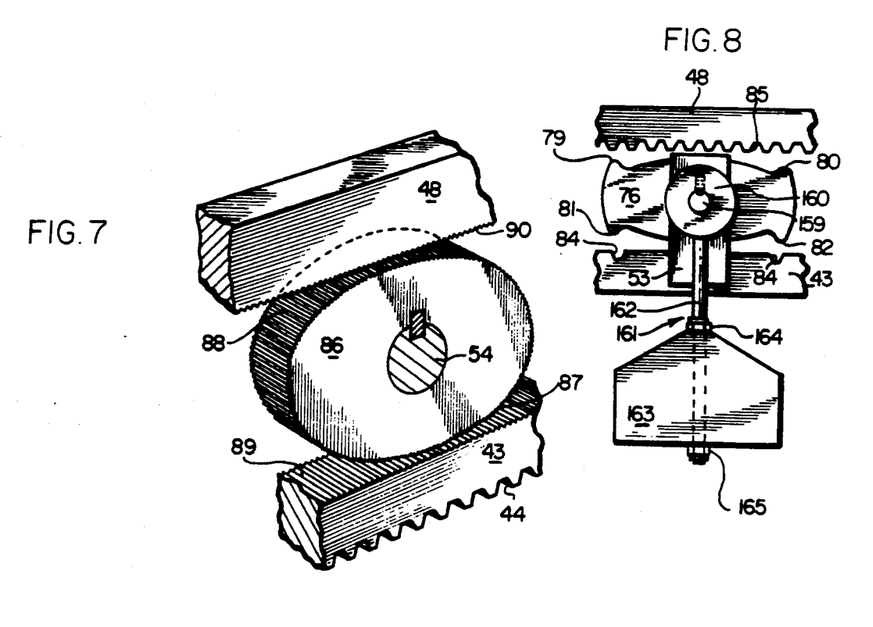
FIG. 7 is an enlarged perspective of another embodiment of a latching element.
FIG. 8 is an enlarged, fragmentary, side elevational view illustrating another embodiment of a latching system in accordance with the present invention.

The latching element illustrated in FIGS. 2-5 is in the form of an elliptical gear. Other embodiments of a latching element are shown in FIGS. 6 and 7. Like elliptical gear 56, these latching elements are mounted on shaft 54, and they are moved between locking and non-locking positions in the same manner as is elliptical gear 56, under the same conditions.

Referring initially to FIG. 6, there is shown a latch element 76 fixed on rotatable shaft 54. Latch element 76 has a pair of upper corner portions 77, 77 and a pair of lower corner portions 78, 78. Located at each upper corner portion 77 is a tooth or projection 79, 80 and located at each lower corner portion 78 is a tooth or projection 81, 82. First slidable member 43 has a pair of indentations 84, 84 each for engagement with one of the lower teeth 81, 82 on latch element 76, when the latch element has been moved to a locking position. Upper or second slide member 48 has a plurality of indentations 85, 85 one of which is engaged by an upper tooth 79, 80 on latching element 76 when the latching element has been moved into a locking position.

A normal, non-locking rest position for element 76 is shown in full lines in FIG. 6. When pendulum 61 is in the position shown in FIG. 5, latch element 76 is moved into the position shown in dash dot lines in FIG. 6 wherein its lower tooth 82 engages an indentation 84 on first slidable member 43, and upper tooth 79 on latching element 76 engages an indentation 85 on upper slide member 48, thereby connecting the two slide members together for slidable movement together.

In FIG. 7 there is shown an embodiment of latch element 86 fixedly mounted on rotatable shaft 54 and having a knurled peripheral surface including a pair of spaced apart knurled surface portions 87, 88 for engaging respective knurled surface portions 89, 90 on slidable members 43, 48 respectively, when latch element 86 is in its locking position, a condition which occurs when pendulum 61 is in the position shown in FIG. 5.

The structure associated with latch elements 76 and 86 (FIGS. 6 and 7) is essentially the same as the structure associated with latch element 56, and the operation of all these latch elements 56, 76 and 86 is essentially the same. The only substantial difference between the latching system illustrated in FIGS. 2-5 and that employing the latch elements illustrated in FIGS. 6 and 7 is the shape of the latch element and the associated engaging structure on the first and second slide members 43, 48.

As noted above, once the latch element is moved into its locking position, it is maintained in that position for at least as long as there is a tendency for the seat back to undergo walkover movement initiated by abnormal deceleration of the vehicle. This will now be described more fully with reference to FIG. 6 and latch element 76, although latching systems employing latch elements 56 or 86 would function in a similar fashion.

Latch element 76 is mounted for pivotal movement in a clockwise sense, as viewed in FIG. 6. Latch element 76 is so positioned in relation to first slidable member 43 that, when the latch element is pivoted into its locking position (dash-dot lines in FIG. 6), tooth 82 on latch element 76 undergoes pivotal movement having a directional component substantially the same as the direction of linear movement of slidable member 43 when the seat back undergoes walkover movement. This direction is indicated by arrow 50 in FIG. 6. At the same time, tooth 79 on latch element 76 undergoes pivotal movement having a directional component substantially opposed to the direction of linear movement of second slidable member 48 when latch element 76 engages both members 43 and 48 and the seat back undergoes walkover movement. The direction in which member 48 moves is indicated by arrow 51 in FIG. 6.

For so long as the seat back has a tendency to undergo walkover movement, member 43 will tend to move in the direction of arrow 50, and the engagement of indentation 84 with tooth 82 will urge latch element 76 in a clockwise sense, as viewed in FIG. 6, to maintain latch element 76 in locking engagement with second member 48. When there is a cessation of walkover movement by the seat back, the tendency of member 43 to move in direction 50 ceases, as does the force maintaining the engagement between (1) tooth 82 on latch element 76 and (2) indentation 84 on member 43. As a result, latch element 76 can be pivoted in a counter-clockwise sense under the urging of pendulum 61 when the normal functioning of the pendulum returns it to its rest position, thereby disengaging latch element 76 from both slidable members 43 and 48.

The relationships described in the two preceding paragraphs occur because the latch element pivots in the same sense as the pendulum. This co-pivotal effect exists because of the three-gear linkage between the pendulum and the latch element. The same co-pivotal effect can be obtained by mounting the latch element directly on the pendulum or on a rotatable pivot pin for the pendulum (FIG. 8).

There is an advantage to employing a multi-gear linkage between the latch element and pendulum 61 which is not available when the latch element is mounted directly on the pendulum or its pivot pin. More particularly, when the latch element is directly mounted on the the pendulum or its pivot pin, the latch element of necessity swings through the same arc as the pendulum. However, when the latch element is connected to the pendulum by a multi-gear linkage, one can have the latch element swing through an arc either more than or less than (or the same as) the arc of the pendulum, depending upon the selection of gear ratios.

On the other hand, when the latch element is mounted directly on the pendulum or its pivot pin, there is a reduction in the number of parts (e.g. elimination of the gear linkage between the pendulum and the latch element), with its attendant economies.

Pendulum bob 63 may be mounted for adjustable movement along the length of pendulum arm 62, e.g. by threadedly engaging the bob on the arm. Changing the position of bob 63 on arm 62 changes the distance between (a) the pivotal axis of the pendulum, at pivot shaft 59, and (b) the center of gravity of bob 63, and this is tantamount to adjusting the length of pendulum arm 62. The weight of bob 63 can be changed with weight shims (not shown) added to or removed from the bob, e.g. on flat surface 65 of bob 63, employing removable threaded fasteners (not shown) engaging internally threaded openings at surface 65.

The expedients described in the preceding paragraph may be utilized to change the magnitude of vehicle deceleration at which the latching system is automatically activated, in accordance with known principles of pendulum operation. More particularly, increasing the weight of the pendulum bob or decreasing the length of the pendulum arm, or both, decreases the magnitude of vehicle deceleration required to swing pendulum 61 to a position at which the latching system is automatically activated (FIG. 5).

In the embodiment illustrated in FIG. 8, a pendulum 161 has an upper portion 160 fixed on a pivot pin 159 rotatably mounted on vertically disposed member 53, on one side of member 53. Also fixed on pivot pin 159, on the other side of member 53 is latch element 76. As a result of this arrangement, the latch element swings directly with the pendulum and moves directly with the pendulum as the pendulum is carried by first member 43 (via member 53) when first member 43 undergoes movement.

Pendulum 161 also comprises a pendulum arm in the form of an externally threaded rod 162, extending downwardly from pendulum upper portion 160 through an unthreaded opening in a pendulum bob 163 which is slidably mounted on arm 162 and is maintained in a preselected position on externally threaded arm 162 by upper and lower internally threaded nuts 164, 165. The position of bob 163 on arm 162 can be vertically adjusted by loosening nuts 164, 165, then sliding bob 163 on arm 162 to a newly selected position, and then tightening nuts 164, 165 against bob 163 to hold the bob in its new position on arm 162. Changing the position of bob 163 on arm 162 is tantamount to changing the length of the pendulum arm, and that changes the magnitude of vehicle deceleration at which the latching system is automatically activated. As noted above, the characteristics of the pendulum arrangement can be adjusted to activate the latching system at a normal, relatively moderate vehicle deceleration, 0.3 g for example.

Figure 3:
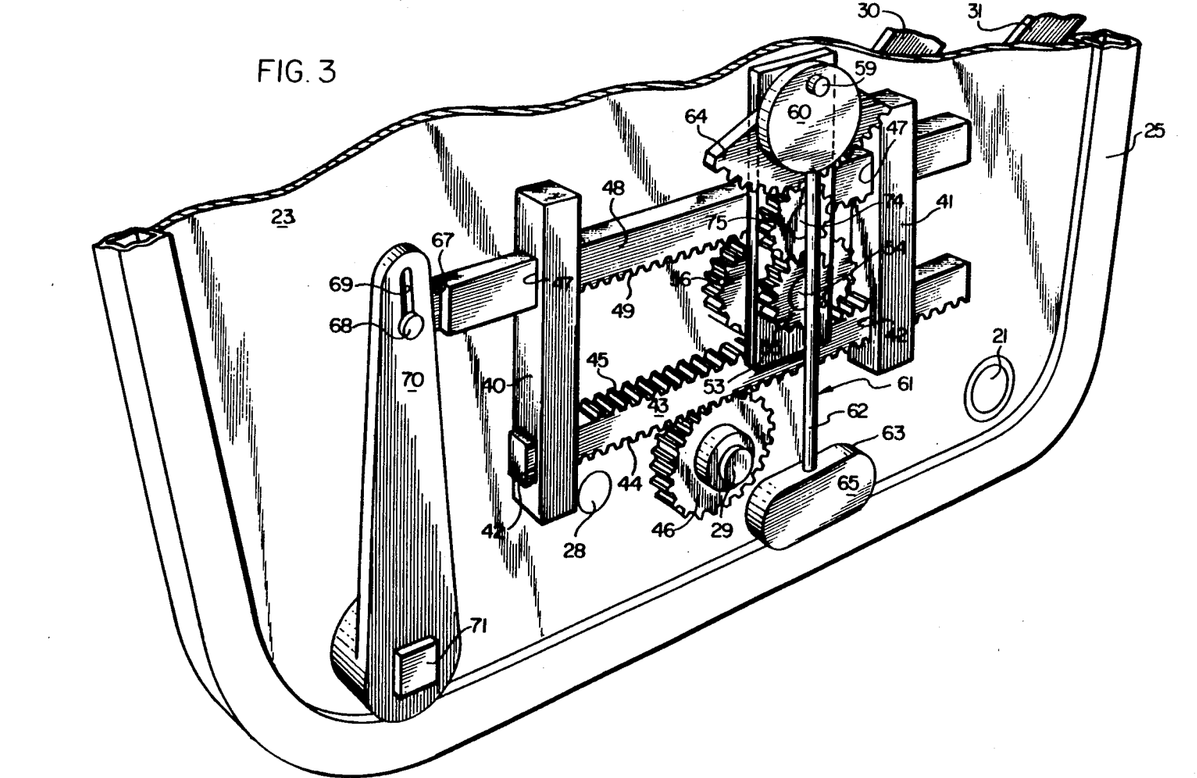
FIG. 3 is an enlarged, fragmentary perspective illustrating the latching system of FIG. 2.
Figure 9:
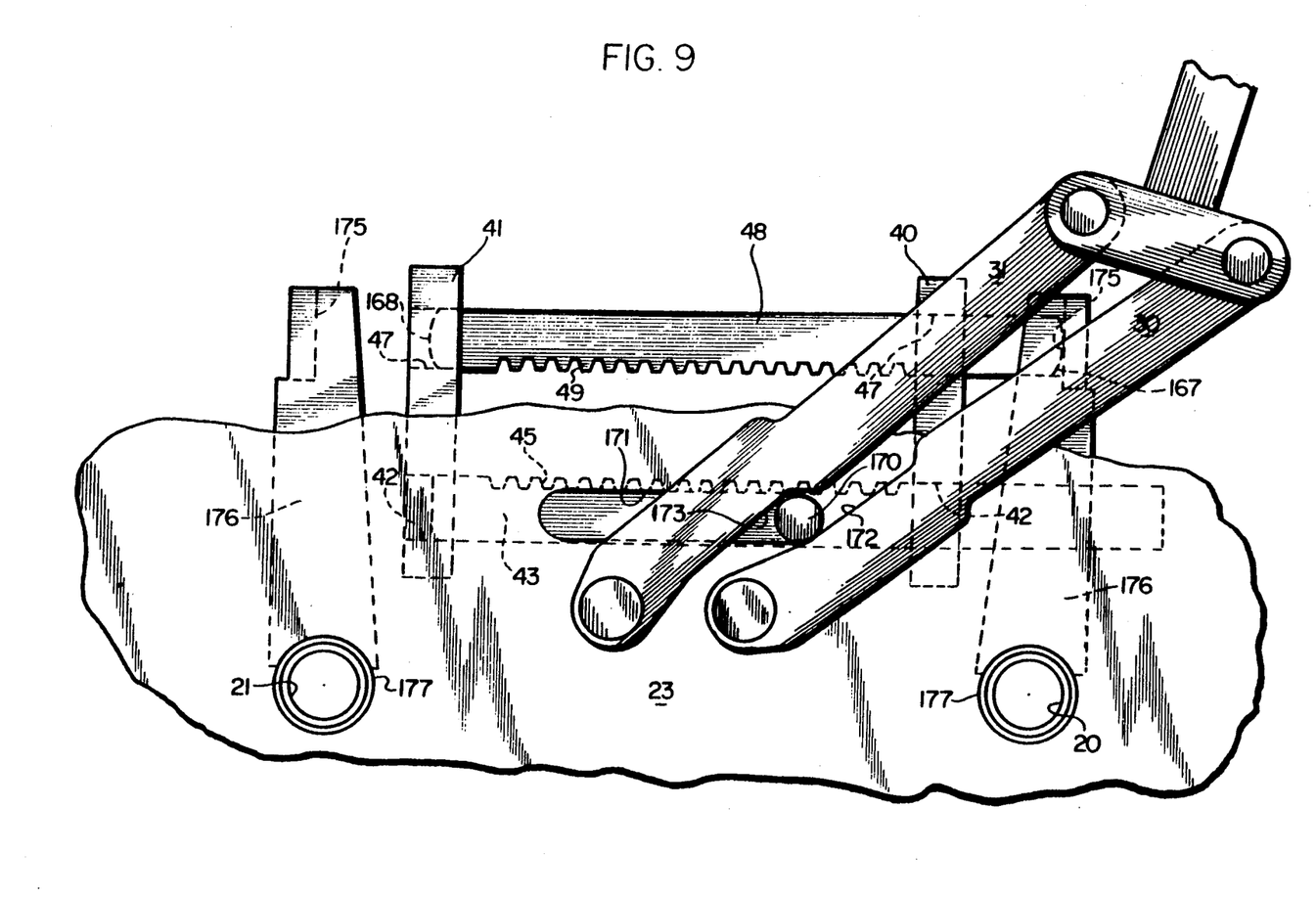
FIG. 9 is an enlarged, fragmentary, side elevational view, partially cut away, illustrating some elements in a further embodiment of a latching system in accordance with the present invention.

Referring now to FIG. 9, in this embodiment, first slidable member 43 is driven by a linkage other than gear 46 and lower row of gear teeth 44 (see embodiment of FIG. 3). The driving linkage in FIG. 9 comprises a pin 170 extending through a slot 171 in side plate 23. Pin 170 is engaged by a lower inner edge portion 172 on link member 30, when link members 30, 31 pivot in a counterclockwise sense (from right to left) as viewed in FIG. 9; and pin 170 is engaged by a lower inner edge portion 173 on link member 31, when the link members pivot in a clockwise sense (from left to right) as viewed in FIG. 9. As link members 30, 31 pivot, they urge pin 170 to slide along slot 171 thereby sliding member 43. The rest of the structure associated with the embodiment of FIG. 9 (much of which is not shown) may be the same as the structure in the embodiments of FIGS. 1-8, although a double torsion bar arrangement may be utilized, as shown in FIG. 9.

More particularly, upper slidable member 48 has a pair of opposite ends 167, 168 each of which is convexly curved to engage a tab 175 at the upper end of a respective torsion lever 176 having a lower end fixed on a torsion bar 177. There are a pair of levers 176 and a pair of torsion bars 177 each associated with a respective end 167, 168 of upper slidable member 48. Each torsion bar 177 is similar to torsion bar 71 in the embodiments of FIGS. 1-8. The torsion bar associated with upper slidable member end 167 is actuated when slidable member 48 moves to the left, as viewed in FIG. 9 (toward seat end 13 in FIG. 1), and the torsion bar associated with upper slidable member end 168 is actuated when slidable member 48 moves to the right, as viewed in FIG. 9 (toward end 14 in FIG. 1) When slidable member 48 moves to the left, the torsion bar associated with end 168 is inactive, and when slidable member 48 moves to the right, the torsion bar associated with end 167 is inactive.

Referring again to FIG. 1, housing 36 defines a pocket located adjacent one side of seat 10, and the housing totally encloses the latching mechanism rendering that mechanism relatively inaccessible to a passenger. Because of this, there is no potential of injury to the passenger as might occur if the passenger were to come into contact with any part of the latching mechanism.

The latching system is automatically activated only by vehicle deceleration above a preselected magnitude which typically is less than abnormal deceleration. At all other times, the walkover seat may be freely moved between its two normal rest positions, at the seat's opposite ends 13, 14, without the need to manipulate a release handle or pedal or the need to engage in any type of latch deactuating activity. Because the latching system is operated relatively seldom and because there are no actuating handles or pedals requiring operation by a passenger in order to effect normal walkover movement of seat back 12, the need for repairs or maintenance of the latching system is essentially eliminated.

In addition, the latching system is capable of automatic activation when seat back 12 is at either of its two normal rest positions, i.e. at each of the two opposite seat ends 13, 14, or at any position therebetween. As shown in the drawing, both the latching elements and the members engaged by the latching element are mounted on frame plate 23 at a location displaced from seat back 12.

The foregoing detailed description has been given for clearness of understanding only, and no unnecessary limitations should be understood therefrom, as modifications will be obvious to those skilled in the art.

We claim:

1. In combination with a vehicle seat for use with a vehicle which undergoes deceleration, said vehicle seat including a pair of opposite ends, a frame, a seat back, and means mounting said seat back on said frame for walkover movement of the seat back between opposite seat ends, a latching system mounted on said frame and associated with said seat back, said latching system comprising:

inertia-activated latching means (a) for automatically resisting walkover movement by said seat back during vehicle deceleration above a preselected magnitude, when the seat back is at either of said opposite seat ends and at any position therebetween, and (b) for permitting walkover movement of the seat back during vehicle deceleration below said preselected magnitude and when said vehicle is at rest, without the employment of a manual latch release.

2. In a combination as recited in claim 1 wherein said latching system comprises:

dampening means, mounted on said frame, for absorbing impact directed against said seat back from behind during said deceleration above said preselected magnitude.

3. In a combination as recited in claim 2 wherein said latching means comprises:

a latch element;

means mounting said latch element on said frame for movement of the latch element between a locking position and a non-locking, rest position;

a member mounted on said frame and comprising means engageable by said latch element when the latch element is in said locking position;

pendulum means connected to said latch element for moving said latch element from said non-locking, rest position to said locking position in response to vehicle deceleration above said preselected magnitude;

and a linkage, including said latch element and said member, for connecting said seat back to said dampening means when the latch element is in said locking position.

4. In a combination as recited in claim 1 wherein:

said latching means comprises an engagement mechanism including at least two elements;

a first of said two elements comprising a latch element;

means mounting said latch element on said frame for movement of the latch element between a locking position and a non-locking, rest position;

a second of said two elements comprising a member mounted on said frame and comprising means engageable by said latch element when the latch element is in said locking position thereof;

means mounting at least one of said two elements for movement along a linear path extending between said opposite seat ends;

pendulum means connected to said latch element for moving the latch element from said non-locking, rest position to said locking position in response to vehicle deceleration above said preselected magnitude;

and means connecting said one element to said seat back for moving said one element along said linear path in response to walkover movement of the seat back and independent of the movement of said latch element between its locking and non-locking positions.

5. In a combination as recited in claim 1 wherein said latching means comprises:

a latching element mounted on said frame at a location displaced from said seat back;

and a member comprising means engageable by said latch element for resisting said walkover movement, said member being mounted on said frame at a location displaced from said seat back.

6. In a vehicle having a seat including opposite ends, a frame, a seat back, and means mounting said seat back on said frame for walkover movement of the seat back between said opposite seat ends, a latching system mounted on said frame and associated with said seat back, said latching system comprising:

a first member;

a second member spaced from said first member;

means mounting said first member on said frame for reciprocal movement of the first member;

means linking said first member to said seat back for moving said first member in response to walkover movement of the seat back;

a latch element located between said first and second members;

means mounting said latch element on said first member for movement of the latch element between a locking position in which said latch element engages both of said first and second members and a non-locking position in which said latch element is disengaged from at least said second member;

means mounting said second member on said frame for movement of the second member with said first member when said latch element engages both of said members;

said mounting means for the latch element comprising means normally maintaining said latch element in said non-locking position;

a pendulum;

means mounting said pendulum on said first member for carrying said pendulum with said first member as the first member undergoes movement;

said mounting means for the pendulum comprising means mounting said pendulum for swinging movement, independent of the pendulum's movement with the first member, between (a) a vertically disposed pendulum rest position occupied by the pendulum during normal, walkover movement of the seat back and (b) a second position in which the pendulum is angularly displaced from said rest position;

means, responsive to deceleration of said vehicle at a preselected magnitude, for urging said pendulum to said second position thereof;

and means, connecting the pendulum to the latch element and responsive to the movement of said pendulum to said second position thereof, for moving said latch element to said locking position thereof.

7. In a vehicle as recited in claim 6 wherein:

said mounting means for the latch element comprises means mounting said latch element for movement with said first member, independent of said movement of the latch element between said locking and non-locking positions thereof.

8. In a vehicle as recited in claim 7 wherein:

said latch element has a first plurality of teeth for engagement with said first member and a second plurality of teeth, spaced from said first plurality of teeth, for engagement with said second member, when the latch element is in its locking position.

9. In a vehicle as recited in claim 8 wherein:

each of said first and second members has a plurality of indentations each for engagement by a tooth on said latch element.

10. In a vehicle as recited in claim 9 wherein:

said latch element has four corner portions;

and each of said four corner portions has one of said teeth.

11. In a vehicle as recited in claim 7 wherein:

said latch element is an elliptical gear;

and each of said first and second members comprises gear teeth for engagement with said elliptical gear when the latter is in said locking position.

12. In a vehicle as recited in claim 7 wherein:

said latch element has a pair of spaced apart knurled side surfaces;

and each of said first and second members has a knurled side surface for engaging a respective knurled side surface on the latch element when the latter is in its locking position.

13. In a vehicle as recited in claim 7 wherein:

each of said first and second members comprises a horizontally disposed slide bar mounted on said frame for linear sliding movement of said slide bar in a horizontal direction;

each of said slide bars lies in substantially the same vertical plane in vertically spaced relation to the other slide bar;

said latch element is positioned in substantially the same vertical plane as said slide bars, between said slide bars;

and said means mounting the latch element for movement between its locking and non-locking positions comprises means mounting the latch element for pivotal movement about a pivot axis extending transversely to said vertical plane.

14. In a vehicle as recited in claim 13 wherein:

said latch element comprises first engaging means for engaging said first member and second engaging means for engaging said second member;

said pivotal mounting means for the latch element comprises means mounting said first engaging means for movement in a pivotal sense having a directional component substantially the same as the direction of linear movement of said first member when the seat back undergoes walkover movement;

and said pivotal mounting means for the latch element further comprises means mounting said second engaging means for movement in a pivotal sense having a directional component substantially opposed to the direction of linear movement of said second member when the latch element engages both of said members and the seat back undergoes walkover movement.

15. In a vehicle as recited in claim 14 wherein:
said latch element is mounted on said first member for pivotal movement of the latch element in the same sense as said pendulum.

16. In a vehicle as recited in claim 15 wherein:
said mounting means for said pendulum comprises a pivot pin;
means fixing said pendulum on said pivot pin;
and said mounting means for the latch element comprises means fixing said latch element on said pivot pin so as to swing said latch element directly with said pendulum and to move said latch element with said pendulum as the pendulum is carried by said first member when the first member undergoes movement.

17. In a vehicle as recited in claim 7 wherein:
each of said first and second members comprises a slide bar mounted on said frame for sliding movement of said slide bar;
and each of said slide bars lies in substantially the same vertical plane in vertically spaced relation to the other slide bar.

18. In a vehicle as recited in claim 17 and comprising:
dampening means connected to the second member and responsive to the movement of said second member with said first member, for progressively opposing said walkover movement.

19. In a vehicle as recited in claim 18 wherein said dampening means comprises:
a torsion member mounted on said frame and having a pair of ends and extending in a direction transverse to said vertical plane;
a lever having a pair of ends;
means fixing one lever end to an end of said torsion member;
and means for engaging the other lever end with the slide bar which constitutes said second member, so as to translate sliding movement of that slide bar into twisting action on the part of the torsion member.

20. In a vehicle as recited in claim 7 wherein:
each of said first and second members comprises a horizontally disposed slide bar mounted on said frame for sliding movement in a horizontal direction;
each of said slide bars lies in substantially the same vertical plane in vertically spaced relation to the other slide bar;
said latch element is positioned in substantially the same vertical plane as said slide bars, between said slide bars;
and said pendulum swings in an arc lying in a vertical plane parallel to said vertical plane in which said slide bars lie.

21. In a vehicle as recited in claim 7 and comprising:
dampening means connected to said second member and responsive to the movement of said second member with said first member, for progressively opposing said walkover movement.

22. A latching system for use with a walkover seat having a pair of opposite sides and a frame, said latching system comprising:
a pair of members disposed adjacent one side of said walkover seat;
means mounting a first of said members on said frame for reciprocal movement of said first member;
the second of said members being spaced from said first member;
a latch element located between said first and second members;
means mounting said latch element on said first member for movement of the latch element between a locking position in which said latch element engages both of said first and second members and a non-locking position in which said latch element is disengaged from at least said second member;
said mounting means for the latch element comprises means mounting said latch element for movement with said first member, independent of said movement of the latch element between said locking and non-locking positions thereof;
means mounting said second member on said frame for movement of the second member with said first member when said latch element engages both of said members;
said mounting means for the latch element comprising means normally maintaining said latch element in its non-locking position;
pendulum means;
means mounting said pendulum means on said first member for carrying said pendulum means with said first member as the first member undergoes movement;
said mounting means for the pendulum means comprises means mounting said pendulum means for swinging movement, dependent of the movement of said pendulum means with the first member, between a vertically disposed pendulum rest position and a second position in which the pendulum means is angularly displaced from said first position;
and means, connecting the pendulum means to the latch element and responsive to the movement of said pendulum means to its second position, for moving said latch element to its locking position.

23. A latching system as recited in claim 22 wherein:
said latch element has a first plurality of teeth for engagement with said first member and a second plurality of teeth, spaced from said first plurality of teeth, for engagement with said second member, when the latch element is in its locking position.

24. A latching system as recited in claim 23 wherein:
each of said first and second members has a plurality of indentations each for engagement by a tooth on said latch element.

25. A latching system as recited in claim 24 wherein:
said latch element has four corner portions;
and each of said four corner portions has one of said teeth.

26. A latching system as recited in claim 22 wherein:
said latch element is an elliptical gear;
and each of said first and second members comprises gear teeth for engagement with said elliptical gear when the latter is in said locking position.

27. A latching system as recited in claim 22 wherein:
said latch element has a pair of spaced apart knurled peripheral surface portions;
and each of said first and second members has a knurled surface portion for engaging a respective knurled surface portion on the latch element when the latter is in its locking position.

28. A latching system as recited in claim 22 wherein said pendulum means comprises:
an elongated pendulum arm;

a pendulum bob;
and means mounting said pendulum bob for adjustable movement along the length of said pendulum arm.

29. A latching system as recited in claim 22 wherein: said means mounting said latch element for movement between its locking and non-locking positions comprises means mounting the latch element on said first member for pivotal movement of the latch element in the same sense as the pendulum when the pendulum swings between its rest position and its second position.

30. A latching system as recited in claim 22 wherein said mounting means for the latch element comprises:
means mounting said latch element directly on said pendulum means for swinging movement of the latch element directly with said pendulum means and for movement of the latch element with said pendulum means as the pendulum means is carried by said first member when the first member undergoes movement.

31. A latching system as recited in claim 30 wherein:
said mounting means for said pendulum means comprises a pivot pin;
means fixing said pendulum on said pivot pin;
and said mounting means for the latch element comprises means fixing said latch element on said pivot pin.

32. In a vehicle having a seat including opposite ends, a frame, a seat back, and means mounting said seat back for walkover movement between said opposite seat ends, a latching system mounted on said frame and associated with said seat back, said latching system comprising:
a latch element;
means mounting said latch element on said frame for movement of the latch element between (a) a normal inactive, non-latching, rest position, which said latch element occupies during normal walkover movement of said seat back, and (b) a latching position;
means connected to said latch element and responsive to vehicle deceleration above a preselected magnitude for moving said latch element into its latching position;
means for maintaining said latch element in its latching position for so long as said seat back is urged to undergo walkover movement;
means for returning said latch element to its rest position after the cessation of said urge to undergo walkover movement;
a horizontally disposed first slidable member;
means mounting said first slidable member on said frame for reciprocal sliding movement of the first slidable member;
a pair of horizontally spaced link members each having an upper end connected to said seat back and a lower end;
means at the lower end of each link member mounting said link member on said frame for pivotal movement of the link member about a horizontal axis during walkover movement of said seat back;
a pin extending transversely from said horizontally disposed first slidable member;
means on one of said link members for engaging said pin when said one link member pivots about its lower end during walkover movement of said seat back toward one of said opposite seat ends;
and means on the other side of said link members for engaging said pin when said other link member pivots about it slower end during walkover movement of the seat back toward the other of the opposite seat ends;
said engaging means and said pin comprising means cooperating to move said horizontally disposed first slidable member in response to walkover movement of said seat back.

33. In a vehicle as recited in claim 32 and comprising:
a second horizontally disposed slidable member;
means mounting said second slidable member for reciprocal sliding movement;
means, including said latch element, for moving said second slidable member in response to movement of said first slidable member when the latch element is in its latching position;
and dampening means, actuable in response to movement of said second slidable member, for progressively opposing walkover movement of the seat back initiated by abnormal deceleration.

34. In combination with a vehicle seat including opposite ends, a frame, a seat back, and means mounting said seat back on said frame for walkover movement of the seat back between said opposite seat ends, a latching system mounted on said frame and associated with said seat back, said latching system comprising:
inertia-activated latching means;
means mounting said inertia-activated latching means on said frame for movement of said latching means along a linear path extending between said opposite ends;
means connected to said seat back, and responsive to walkover movement of said seat back between said opposite seat ends, for moving said inertia-activated latching means along said path;
said mounting means for said latching means comprising a first horizontally disposed member mounted on said frame, parallel to said linear path, and carrying said inertia-activated latching means;
a second horizontally disposed member mounted on said frame substantially parallel to said first member;
said inertia-activated latching means comprising a latch element, and means mounting said latch element for movement between a normal, inactive, non-latching rest position and a latching position for engaging said second member;
and dampening means associated with said second member and actuable in response to engagement of said second member by said latch element.

35. In combination with a vehicle seat for use with a vehicle which undergoes deceleration, said vehicle seat including opposite ends, a frame, a seat back, and means mounting said seat back on said frame for walkover movement of the seat back between said opposite seat ends, a latching system mounted on said frame and associated with said seat back, said latching system comprising:
an elongated first member mounted on said frame and disposed in a direction extending between said ends;
a second member mounted on said frame and spaced from said first member;
inertia-activated latching means mounted on one of said members;
said latching means comprising a latch element mounted for movement between (a) a normal, inactive, non-locking position occupied by said latch element when the seat back is at each of said opposite ends and during normal walkover movement of the seat back an (b) a locking position for engaging the other of said members;

means connected to said seat back and responsive to walkover movement of the seat back between said opposite ends for moving said latch element along a linear path extending between said opposite ends;

means connected to said latch element and responsive to vehicle deceleration above a preselected magnitude for moving said latch element from (a) said rest position to (b) said locking position, independent of the movement of the latch element along said linear path;

and dampening means mounted on said frame and actuable in response to engagement of said other member by said latch element.

* * * * *